Patented May 2, 1939

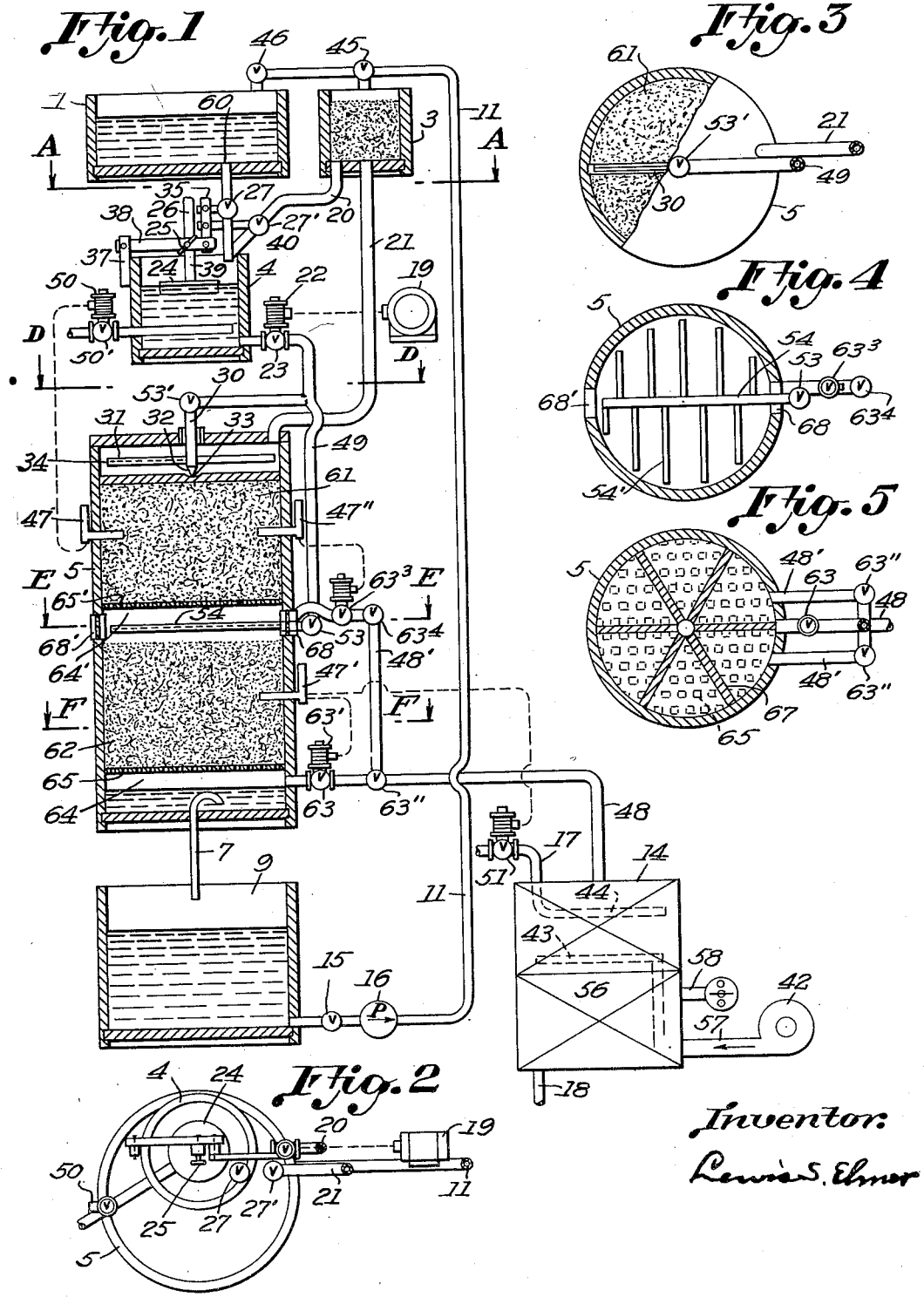

2,156,428

UNITED STATES PATENT OFFICE 2,156,428

VINEGAR GENERATOR SYSTEM

Lewis S. Elmer, Baltimore, Md.

Application January 14, 1937, Serial No. 120,605

5 Claims. (Cl. 99—245)

My invention relates to improvements in vinegar generators and the control of their operation, and has particular reference to the automatic regulation of the volume and temperatures and periodic intervals of the supply of the vinegar and alcoholic mixture to be fed into them, and methods of feeding this mixture fractionally into a multiplicity of zones or segments of a single generator, and means for controlling the internal temperatures of the contents of the zones or segments of a generator by automatically controlling the volume and temperature of both the vinegar mix and of the air or ozone supplied to them and to thereby increase the efficiency and reduce the losses by evaporation from the generator and means for reclaiming the vapors emitted therefrom.

It is a generally accepted fact that with vinegar factories employing a relatively smaller number of large generators of eight or more feet in diameter and fourteen or more feet in height, the cost of construction and maintenance and building area required is much less than with those factories employing an equal total amount of generator porous packing material but having it divided into a larger number of smaller generators of the conventional size of approximately four feet in diameter and eight feet in height, but the smaller generators usually produce a higher yield of vinegar per gallon of alcohol consumed.

My invention combines the advantages of both types of generators.

I attain these objects by providing means whereby the volume and temperature of the vinegar mix, comprising a mixture of vinegar, alcohol, water and acetic bacteria food, and the air supply necessary for oxidation of the alcohol into vinegar, may be accurately and automatically controlled.

A form of apparatus to attain these objects is illustrated in the accompanying drawing in which Figure 1 is a diagrammatic elevation of one form of apparatus.

Figure 2 is a plan view on line A—A of Figure 1.

Figure 3 is a plan view partly in section on line D—D of Figure 1.

Figure 4 is a plan view on line E—E of Figure 1.

Figure 5 is a plan view on line F—F of Figure 1.

Figure 1 shows a large type of vinegar generator 5, with the usual feed tank 1, above it, from which the vinegar mix flows by gravity through the conduit 60 and the cock 27 into the measuring tank 4, and then through the solenoid actuated valve 23, into the duct 49 and the cock 53', and thence a fractional part of this liquid flows into the distributor 30, and thence percolates down through the porous packing 61, where the alcoholic content of the mix is partially converted into acetic acid and aldehyde, with the emission of heat, by the activity of acetic bacteria present upon the surfaces of the said porous packing material, in combining the alcohol with oxygen of the air which is supplied through the ducts 48, 48', cocks 63⁴, solenoid valve 63³ and the latticed floor 65' and also arising from the porous packing 62.

Another fractional part of the mix fluid flows through the duct 49 and cock 53 and the distributor 54 to the porous packing 62, where it is commingled with the partially converted vinegar mix which trickles from the porous packing 61 above and proceeds to trickle down through the packing 62, while the alcoholic content is being oxidized into vinegar by the combined action of the acetic bacteria, which has accumulated upon the surface of the porous packing material 62, in the presence of air from the air conditioning chamber 14 passing through the duct 48, the solenoid actuated valve 63, and cocks 63'', the bottom chamber 64 of the generator 5, and through the latticed floor 65, which supports the porous packing 62. The finished vinegar, which accumulates in the lowest generator chamber 64, flows down through the siphon 7, into the storage tank 9. From the tank 9 a requisite portion of the vinegar is, when needed, pumped by the pump 16, in combination with a sufficiency of low strength alcoholic liquid, obtained from a suitable source, through the pipe 11 and valve 46 into the tank 1 for the continued production of vinegar. This pumping usually occurs on another day.

The solenoid 22, which actuates the valve 23, receives electrical impulses at uniformly periodic intervals, which are controlled by any suitable timing device 19, whereby the valve 23 is opened and remains open a definite predetermined period of time, at the termination of which, the valve 23 will close. As the float 24 actuated cocks or valves 27 and 27' maintain a constant level of liquid within the measuring tank 4, except during the brief periods while the said liquid is being discharged by the opened valve 23, it is apparent that an equal volume of vinegar mix is supplied to the generator at the said periodic intervals, so that there is no unintentional variation or interruption of liquid supplied to the generator as is the case with the conventional method of setting by sight the flow from a cock. It is also apparent that the volume of the said liquid fed at each actuation of the valve 23 may be increased or decreased by the adjustment of the position of the float 24 by the adjusting screw 25.

The heat transferring coil or device, within the measuring tank 4, is regulated by valve 50', which is actuated by the solenoid 50. The solenoid 50, receives its electric impulses through the control-thermostat 47, and the said heat transferring coil is adapted to regulate the temperature of the vinegar mix contained within the measuring tank 4.

The generator 5 is of the conventional large type, but is modified by the intermediate air chamber 64', containing the mix distributor 54, connected with the valve 53 and the duct 49. The chamber 64' is also connected with the air duct 48' through the valve 63³ and cocks 63⁴. The types of distributors illustrated as 30, in Figures 1 and 3 and as 54 in Figures 1 and 4, are shown for convenience, but tilting troughs or any suitable device may be substituted for them.

It is also apparent that the relative volumes of vinegar mix, which it is desired to flow through the duct 49 into the distributors 30, Figure 1, and 54, in Figures 1 and 4, may be determined at will by the adjustment of the cocks 53 and 53' as shown in Figures 1, 3 and 4.

The number of vertical sections of generator packings as illustrated at 61 and 62, Figure 1, and the air spaces, containing mix distributors between the said sections, may be increased at will. These generator sections may be further subdivided vertically by partitions 67, as in Figure 5.

The branches 54' of the distributor 54, shown in Figure 4, each have a plurality of orifices suitable to divide the liquid, which flows into them and to thereby distribute it over the entire surface of the packing 62, Figure 1.

Removable windows 68 and 68', shown in Figures 1 and 4, are disposed on opposite sides of the generator 5, and are suitable to permit observation of the distributor 54, shown in Figures 1 and 4, and to provide access for the removal of the same from the generator 5. The distributor 30, Figures 1 and 3, is the conventional centrifugal self rotating type, but may be replaced by any suitable one.

The air passing from the blower 42, through the duct 57, the air conditioner 14, when employed, the ducts 48 and 48', to the valves 63 and 63³, and the cocks 63'' and 63⁴, enters the bottom chamber 64 and the upper chamber 64', Figure 1, and rises through the latticed floors 65 and 65' to permeate the packing 62 and 61 to promote acidification of the alcoholic content of the downward trickling vinegar mix. The intake air valves 63 and 63³, the valve 51 of the heat exchanging device 17, being actuated by solenoids may be controlled by any of the thermometer-controllers 47, 47' or 47'', which may be disposed at any suitable position upon the generator 5.

The vent duct 21, Figures 1 and 3, leads the vapors evaporated by the generator into the condenser 3 for the recovery of the valuable constituents of the vapors. The liquid thereby condensed is returned through the duct 20 and the valve or cock 27' into the measuring tank 4.

In large generators as conventionally constructed it is found that the entire alcoholic content of the vinegar mix is fed upon the uppermost surface of the shavings or packing while the air is supplied through openings near the bottom of the staves of the generator vat.

Consequently the maximum volume of oxygen comes first in contact with the minimum remaining alcoholic content of the downward trickling vinegar mix, therefore the lower regions of the generator develop the least heat from the chemical reaction, while the highest regions develop the maximum temperatures, thereby causing excessive losses by evaporation of the volatile alcohols and aldehydes of the mix and hence reduce the efficiency of the generator.

Various attempts have heretofore been made to overcome these disadvantages but the methods employed have developed other disadvantages. Some have circulated the liquid back and forth by pumping, but this method requires constant observation to determine when the alcohol has been converted into vinegar and pumps fail to operate and observers fail to observe at the proper time. My invention provides a simple automatic controlled gravity operation of the generator at minimum cost and of maximum efficiency.

I claim:

1. A vinegar generator system, which comprises in combination, a generator, a means for fluid course for the passage by gravity of vinegar-mix from an elevated reservoir through the generator for its conversion into vinegar and thence into a storage reservoir, said fluid course being provided with a measuring vessel for the mix, said vessel having a vertically adjustable float, said float being suitably connected for actuation of the cock for the admission of mix from the reservoir, a discharge duct for the vessel being provided with an electrically actuatable valve, an electric circuit to control the electrically actuatable valve, a suitable clock for the control of the electric circuit, whereby the volume of mix flowing into the generator may be regulated automatically and whereby the same may be adjusted manually.

2. A vinegar generator system comprising a generator having means for a suitable fluid path by gravity for vinegar-mix from a supply reservoir for the same, through a suitable measuring vessel for the mix, said vessel having means to suitably regulate the volume of mix for the said fluid path by the employment of a float within said vessel, suitable connections for the float whereby to regulate the inlets to said vessel, means for suitable adjustment for the position of the float by the employment of a telescopic shaft and set screw for the same, and means for the periodic discharge for the vessel by the employment of a solenoid actuatable valve in association with a clock-work timing device suitable to regulate an electric circuit for the actuation of the solenoid valve, an electric circuit for actuation of the solenoid valve, and a suitable fluid path from the said solenoid valve by gravity into distributors for mix the same being disposed within the generator.

3. A vinegar generator system for the conversion of an alcohol contained mix into vinegar by gravity flow without re-circulation of the mix, comprising a generator having a clock-work timing device for the regulation of means for supplying to the generator periodically a measured quantity of vinegar-mix at predetermined intervals, said means to include a measuring vessel having an adjustable float suitably connected with inlet valves for the vessel and the vessel having a solenoid valve for its outlet duct, the said solenoid being actuatably controlled by the said clock-work timing device, suitable packing material for the generator, said packing material being sub-divided vertically by chambers, said chambers being suitable to contain mix distributors, each of said distributors for the chambers being suitably connected by valved ducts with a source of supply for mix, whereby the said supply of mix for each distributor may be proportioned suitably for maximum efficiency, air inlet courses for the chambers, including suitable cocks, valves, actuatable elements for the valves, ducts leading to a source of supply for air, temperature sensitive instruments for the generator suitable and suitably connected for the actuation of said valves for air, whereby temperatures within the generator may regulate the said valves for the requisite volume of air for the generator for the conversion of the alcoholic content of the mix into vinegar.

4. A vinegar generator system of the type employing a single passage gravity flow of mix for complete conversion into vinegar within a single generator, a generator being modified by sub-divisions into sectors by radial vertical partitions, a clock controlled device for the regulation of means for the supply of mix for the generator, temperature sensitive controllers for the generator whereby its interior temperature may actuate suitable elements for the regulation of a valve for its air supply means, a suitable valve for the control of said air supply means, said temperature sensitive controllers being suitable and being operatively connected to said valve by the employment of an electric circuit and an electric magnet for the control of a valve for an air conditioning element for the air supply means whereby the air for the generator may be tempered suitably for maximum oxidation efficiency for the generator.

5. A vinegar generator system of the type for single gravity flow without re-circulation, comprising a generator having a vessel for measuring the supply of mix, said vessel having a clock controllable magnetic actuatable valve suitable to provide periodic discharge into the distributors for the same within the generator, said vessel having within it a temperature regulatable element for the mix while contained by the vessel, operable means for the said element by the employment of a suitable fluid refrigerant controlled by a valve, a suitable valve for the said element, operable means for the valve by the employment of an expandable and contractable element to open and close the valve, suitable means associated with the said operable means for the valve and with a thermostatic-controller suitable for the actuation of the said valve by the said thermostatic-controller, said thermostatic-controller suitably disposed in the generator for the actuation of the said valve, the thermostatic-controller having means for its adjustment to actuate at maximum and minimum temperatures affecting it, whereby the mix while contained within the said vessel may have its temperature regulated and whereby the temperature of the mix discharged into the generator may assist in the maintenance of favorable temperatures for the oxidation of alcoholic content of the mix into vinegar.

LEWIS S. ELMER.